United States Patent Office 2,787,803
Patented Apr. 9, 1957

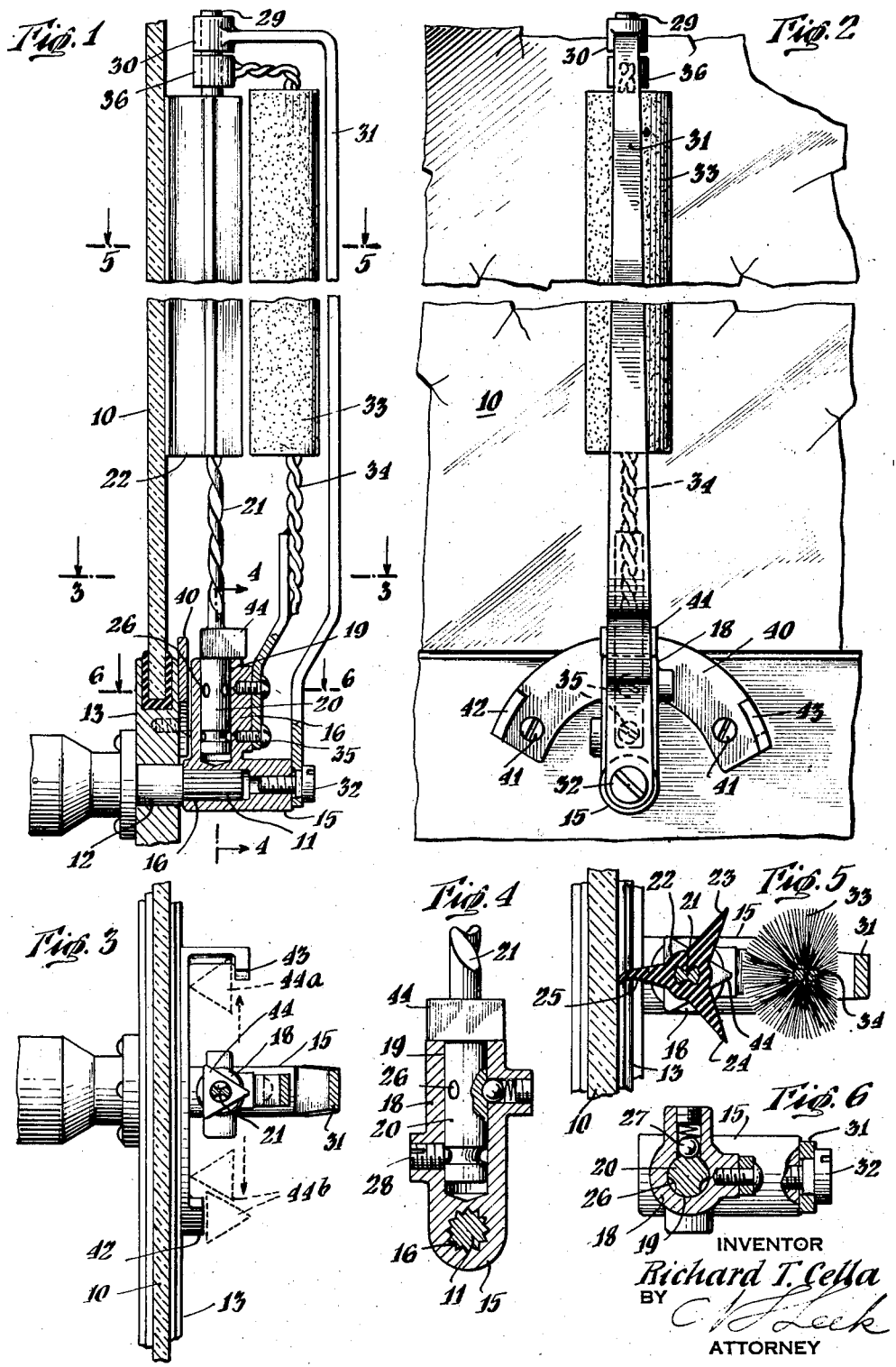

2,787,803

WINDSHIELD WIPER

Richard T. Cella, Trenton, N. J.

Application September 22, 1954, Serial No. 457,599

2 Claims. (Cl. 15—254)

This invention relates to windshield wipers and has for an object to provide a windshield wiper which includes automatic cleaning means for cleaning the blade after each wiping stroke, so as to prevent accumulation of dirt particles thereon which would tend to scratch the windshield.

Various other objects and advantages will be apparent as the nature of the invention is more fully disclosed.

In accordance with the present invention the windshield wiper is provided with a multiple edge blade which is rotatable to bring a clean edge into contact with the windshield after each wiping stroke. A brush is mounted to swing with the wiper and is positioned to clean the used edge automatically as the edge is turned past the brush, and before it is again applied to the windshield in wiping position. The invention also provides a construction wherein the wiping stroke of the blade always occurs in the same direction, after which it is cleaned to prevent any dirt particles which are accumulated on the blade or on the windshield at the end of the stroke from being returned across the windshield on the return stroke of the wiper.

The invention will be better understood by referring to the following description, taken in connection with the accompanying drawing in which a specific embodiment thereof has been set forth for purposes of illustration.

In the drawings:

Fig. 1 is a sectional view through a windshield showing the windshield wiper in elevation and at about the midpoint of its wiping stroke;

Fig. 2 is a front elevation of the windshield wiper;

Fig. 3 is a transverse section taken on the line 3—3 of Fig. 1 showing the blade turning cam;

Fig. 4 is a partial vertical section taken on the line 4—4 of Fig. 1 showing the mounting for the blade shaft;

Fig. 5 is a transverse section taken on the line 5—5 of Fig. 1 showing the arrangement of the blade and brush; and Fig. 6 is a transverse section taken on the line 6—6 of Fig. 1 showing the detent for aligning the blade edges for wiping.

Referring to the drawing more in detail, the invention is shown as embodied in a wiper mounted on a windshield 10 which is of standard construction and is of the type commonly used on motor vehicles. An oscillating shaft 11 is mounted in a housing 12 which is secured to the cowl 13 below the windshield 10 and is driven by suitable means not shown such as a hydraulic motor.

The wiper in accordance with the present invention comprises a hub 15 having an axial bore 16 which is splined onto the end of the oscillating shaft 11. The hub 15 carries a socket member 18 having a socket 19 therein in which a pin 20 is mounted for rotation about an axis normal to the axis of the shaft 11.

The pin 20 carries a flexible shaft 21 to which a wiper blade 22 is secured. The wiper blade 22 as shown in section in Fig. 5 is provided with three wiping edges 23, 24 and 25, which are spaced approximately 120 degrees apart and are so arranged that any one of the edges may contact the surface of the windshield.

The pin 20 is provided with a plurality of recesses 26 (Fig. 4) which are engaged by a spring-pressed ball 27 secured in the socket member 18 and adapted to orient the blade 22 so that a selected one of the edges 23, 24 and 25 is in contact with the outer surface of the windshield. A retaining screw 28 secures the pin 20 in the socket 19.

The upper end of the shaft 21 carries a pin 29 which fits rotatably in a boss 30 attached to a spring arm 31, the lower end of which is attached to the hub 15 by set screw 32 and which is adapted to exert spring pressure against the wiper for holding the blade 22 firmly against the surface of the windshield and to permit the wiper to flex as required to conform to a curved windshield.

A cleaning brush 33 is mounted on a flexible arm 34 the lower end of which is secured to the socket member 18 by screws 35 and the upper end of which carries a boss 36 which is journaled on the pin 29 below the boss 30. The brush 33 is arranged to engage and clean the edges of the wiper blade as the blade is rotated during its operation.

For rotating the blade a bracket 40 is attached to the cowl 13 as by screws 41. The bracket 40 is provided at one end with a shoulder 42 and at the other end with a finger 43 which is spaced outwardly from the bracket as shown in Fig. 3. A triangular cam 44 is attached to the pin 20 in a position to engage the shoulder 42 or the finger 43 at the opposite ends of the stroke of the wiper blade. The cam 44 is shown in full lines in Fig. 3 in wiping position in which the edge 25 of the wiper blade 22 is disposed against the surface of the windshield as shown in Fig. 5. When the cam 44 reaches the finger 43 it is turned 60° as indicated by the position of the dotted cam 44a thereby bringing the edge 25 of the blade 22 out of contact with the surface of the windshield. The edge 25 remains out of contact with the windshield during its return stroke. At the end of the return stroke the cam 44 engages the shoulder 42 and is turned thereby another 60° into the position indicated by the dotted cam 44b in Fig. 3 which will bring the edge 23 of the blade 22 into wiping position where it remains during the next wiping stroke. As the blade is rotated a total of 120° by the finger 43 and the shoulder 42 during each wiping and return stroke the edge 23 of the blade is turned past the brush 33 which thus removes any dirt particles or sediment adhering to the blade.

It is evident from the above that a clean blade surface is brought into contact with the windshield at each wiping stroke and that the blade is removed from contact with the windshield at the end of each wiping stroke and remains out of contact during the return stroke of the wiper. The oscillating shaft 11 is preferably driven hydraulically from a separate hydraulic pump or from the central hydraulic system of the vehicle as desired.

It is also to be noted that the arrangement is such that the entire assembly is carried by the hub 15 which may be attached to a standard wiper shaft.

Although a specific embodiment has been shown for purposes of illustration it is to be understood that various changes and adaptations may be made therein and that the invention may be applied to various uses as will be apparent to a person skilled in the art.

What is claimed is:

1. A windshield wiper comprising a hub, means mounting said hub to oscillate about a horizontal axis, a socket member carried by said hub, a shaft carrying a wiper blade mounted to rotate in said socket member, said blade having a plurality of independent wiping edges to be brought successively into wiping position as the blade is rotated, a brush attached to said socket member and positioned to engage and clean said wiping edges as the blade rotates, a cam member attached to said shaft, a fixed bracket having members engaging said cam member at each end of the blade stroke and adapted to turn said cam member to remove the edge from the windshield at the end of its wiping stroke and to bring a new wiping edge into contact with the windshield at the beginning of the next wiping stroke.

2. A windshield wiper comprising a hub, means mounting said hub to oscillate about a horizontal axis, a socket member carried by said hub, a shaft carrying a wiper blade mounted to rotate in said socket member, said blade having a plurality of independent wiping edges to be brought successively into wiping position as the blade is rotated, a brush attached to said socket member and positioned to engage and clean said wiping edges as the blade rotates, a cam member attached to said shaft, a fixed bracket having members engaging said cam member at each end of the blade stroke and adapted to turn said cam member to remove the edge from the windshield at the end of its wiping stroke and to bring a new wiping edge into contact with the windshield at the beginning of the next wiping stroke, and a spring member carried by said hub and bearing against the free end of said shaft to hold the blade in wiping contact with the windshield.

References Cited in the file of this patent
UNITED STATES PATENTS

| | | |
|---|---|---|
| 1,515,406 | Peterson | Nov. 11, 1924 |
| 1,739,896 | Garbell | Dec. 17, 1929 |
| 2,392,230 | Collins | Jan. 1, 1946 |